(12) United States Patent
Halay et al.

(10) Patent No.: US 11,265,891 B1
(45) Date of Patent: Mar. 1, 2022

(54) PRIORITY BASED TRANSMISSION

(71) Applicant: Raft Technologies Ltd., Tel Aviv (IL)

(72) Inventors: Nir Halay, Tel Aviv (IL); Tamir Ostfeld, Kfar Saba (IL); Elad Segalis, Haifa (IL)

(73) Assignee: Raft Technologies Ltd., Tel Aviv (IL)

(*) Notice: Subject to any disclaimer, the term of this patent is extended or adjusted under 35 U.S.C. 154(b) by 0 days.

(21) Appl. No.: 16/546,326

(22) Filed: Aug. 21, 2019

Related U.S. Application Data

(60) Provisional application No. 62/720,461, filed on Aug. 21, 2018.

(51) Int. Cl.
| | |
|---|---|
| *H04W 72/12* | (2009.01) |
| *H04W 72/10* | (2009.01) |
| *H04W 72/04* | (2009.01) |
| *H04L 5/00* | (2006.01) |
| *H04L 27/26* | (2006.01) |

(52) U.S. Cl.
CPC ......... *H04W 72/1242* (2013.01); *H04L 5/001* (2013.01); *H04L 27/2628* (2013.01); *H04W 72/0446* (2013.01); *H04W 72/10* (2013.01)

(58) Field of Classification Search
CPC ............. H04W 72/12; H04W 72/1221; H04W 72/1242; H04W 72/04; H04W 72/044; H04W 72/0446; H04W 72/10; H04L 27/2628; H04L 5/00; H04L 5/001
See application file for complete search history.

(56) References Cited

U.S. PATENT DOCUMENTS

| | | | | |
|---|---|---|---|---|
| 8,654,815 | B1* | 2/2014 | Forenza | H04L 5/0023 |
| | | | | 375/141 |
| 9,215,726 | B1* | 12/2015 | Adams | H04W 28/0236 |
| 9,584,193 | B2* | 2/2017 | Stratigos, Jr. | H04B 7/0885 |
| 10,419,975 | B1* | 9/2019 | Adams | H04L 5/0048 |
| 10,785,077 | B1* | 9/2020 | Malay | H04L 27/2628 |
| 2003/0093187 | A1* | 5/2003 | Walker | B64D 45/0059 |
| | | | | 701/1 |
| 2004/0053576 | A1* | 3/2004 | Vasseur | H04H 20/12 |
| | | | | 455/63.1 |
| 2008/0013564 | A1* | 1/2008 | Koski | H04W 74/0833 |
| | | | | 370/445 |
| 2012/0029818 | A1* | 2/2012 | Smith | G01S 1/24 |
| | | | | 701/468 |
| 2014/0269492 | A1* | 9/2014 | Forenza | H04B 7/0452 |
| | | | | 370/328 |
| 2014/0269502 | A1* | 9/2014 | Forenza | H04B 7/0456 |
| | | | | 370/328 |
| 2016/0018509 | A1* | 1/2016 | McCorkle | H01Q 9/28 |
| | | | | 342/386 |
| 2017/0223653 | A1* | 8/2017 | Weitnauer | H04B 7/024 |
| 2020/0328841 | A1* | 10/2020 | Babich | H04L 1/0018 |

* cited by examiner

*Primary Examiner* — Kevin D Mew
(74) *Attorney, Agent, or Firm* — Reches Patents

(57) ABSTRACT

There may be provided a method for priory based transmission of skywave symbols, the method may include starting to transmit a first skywave symbol; determining to stop a transmission of the first skywave symbol and to transmit a second skywave symbol that has a higher priority than the first skywave symbol; stopping the transmission of first skywave symbol before a completion of the transmission of the first skywave symbol thereby transmitting a partial first skywave symbol; and transmitting the second skywave symbol.

19 Claims, 8 Drawing Sheets

Receiving, by a skywave propagation receiver, received signals that are within a skywave frequency range that comprises legal subcarriers and illegal subcarriers. 110

Detecting a reception of the skywave symbol based on at least one energy parameter related to at least two out of (a) received signals at the illegal subcarriers, (b) received signals at the legal subcarriers, (c) received signals at any of the subcarriers. 120

Processing the skywave symbol to extract the message embedded in the skywave symbol. 130

PRIORITY BASED TRANSMISSION

CROSS REFERENCE

This application claims priority from U.S. provisional patent 62/720,461 filing date Aug. 21, 2018.

BACKGROUND

The atmosphere is the gaseous envelope surrounding the planet Earth and comprising a mixture of gases. The ionosphere is the upper part of the Earth's atmosphere. Scientifically, above the stratosphere, which means beyond an altitude of 60 km up to 1000 km, the atmosphere is characterized by a high density of free electrons and free ions, mostly produced by the energetic photo-ionization of UV and X-rays arriving from the sun, and to a minor extent over high latitudes by corpuscular ionization.

A high or relevant density of free electrons and free ions is not a clearly defining characteristic because electrons and ions are present at every altitude in the lower and upper atmosphere.

Therefore, a more practical definition, originating from the first application of long distance radio communications, is that part of the atmosphere in which the density of ionization is sufficient to deflect (Deflected means it bounces back on the plane surface when it is bent by a gravitational force) radio waves in the 2-30 MHz range.

This part of the atmosphere, the ionosphere, includes the following layers: the mesosphere, thermosphere, and exosphere.

The radiation of the sun ionizes gasses in the ionosphere. Several ionospheric layers (regions) can be identified, each layer having its particular composition and being ionized by specific wavelengths in the solar radiation. Modern experimental and theoretical investigations divide the ionosphere into three regions: D, E, and F.

The real heights of the ionospheric layers vary with solar zenith angle time, time of day, seasons, solar cycles, and solar activity.

The F-layer (160-1000 km height) is the layer with the highest electron density, which implies signals penetrating this layer will escape into space atomic. By daylight, the F-layer is split into a lower F1-layer (160-210 km height) and a higher F2-layer (above 210 km height). The E-layer (90-160 km height) can only reflect radio waves having frequencies lower than about 10 MHz. The D-layer (60-90 km height), is responsible for high attenuation at the lower HF frequencies, disappears almost completely at night. Therefore allowing frequencies which are not usable during the day to propagate successfully at night. The F1-layer always disappears during the night and sometimes in winter even during the day.

The F2 layer is present 24 hours a day under all solar terrestrial conditions, making it the most important layer of the ionosphere.

The main characteristics of the F2 layer are its high variability, on timescales ranging from the 11 years of a solar cycle and even longer, to a few seconds during strong interactions with the plasmasphere above (at altitudes >1,000 km) depending on solar-terrestrial conditions. The Sun does affect the electron density of the F2 layers causing a rapid increase after sunrise, with maximum values occurring at any time during the day.

A sporadic E layer occurs at altitudes from 90 to 140 km (the E region). Usually, it is considered independent of the normal E layer of the ionosphere.

Most importantly, sporadic E layers can have an electron density similar to the F region. However, its random time of occurrence and presence at any particular place makes Es layer prediction very difficult.

Electromagnetic waves entering the ionosphere may be refracted back to Earth, depending on the operating frequency.

The High Frequency (HF) band is defined by the International Telecommunication Union (ITU) as radio waves with frequencies between 3 MHz and 30 MHz. HF radio signals can propagate via 3 different ways:

a. Ground waves: near the ground for short distances, up to 100 km over land and 300 km over sea.

b. Direct waves: available through line-of-sight. Available only in distances with line-of-sight.

c. Skywaves: reflected by the Ionosphere, all distances.

For long distances (more than 1000 km) between the transmitter and the receiver, only skywaves are applicable for HF transmission.

Not all HF waves are reflected by the Ionosphere. If the frequency is too high, the wave will penetrate through the Ionosphere. If it is too low, it will be absorbed by the D region. Furthermore, the Ionosphere is usually not stable. It variates during solar cycles (roughly 11 years), seasons and even during each day. These variations cause difficulties in HF radio transmission. For example, the range of usable frequencies will vary throughout the day, with the seasons, and with the solar cycle.

For long distances between the transmitter and the receiver, one reflection from the Ionosphere is not enough. The radio wave is returned to earth and refracted from the Ionosphere once again. This double "hop" causes significant deterioration in signal power due to the refraction from earth and the double propagation in the D region. Furthermore, multiple number of "hops" can co-exist in a single transmission. The effect of this multi-path translates into severe channel conditions that should be accounted for at the receiver.

Accordingly—skywave signals propagate over a problematic HF channel that exhibits substantial attenuations and/or delays and/or interference that change dynamically over time and frequency.

HF communication also exhibits low throughput.

The transmission over HF is problematic and there is a growing need to provide a system, method and computer readable medium for efficient HF transmission and reception.

SUMMARY

There may be provided a skywave receiver, a skywave transmitter, a method and a non-transitory computer readable medium for receiving skywave symbols and/or receiving skywave symbols and/or reconstructing skywave symbols.

BRIEF DESCRIPTION OF THE DRAWINGS

In order to understand the invention and to see how it may be carried out in practice, a preferred embodiment will now be described, by way of non-limiting example only, with reference to the accompanying drawings:

FIG. 2A illustrates a method for detecting a skywave symbol;

DETAILED DESCRIPTION OF THE DRAWINGS

Figure 1A:
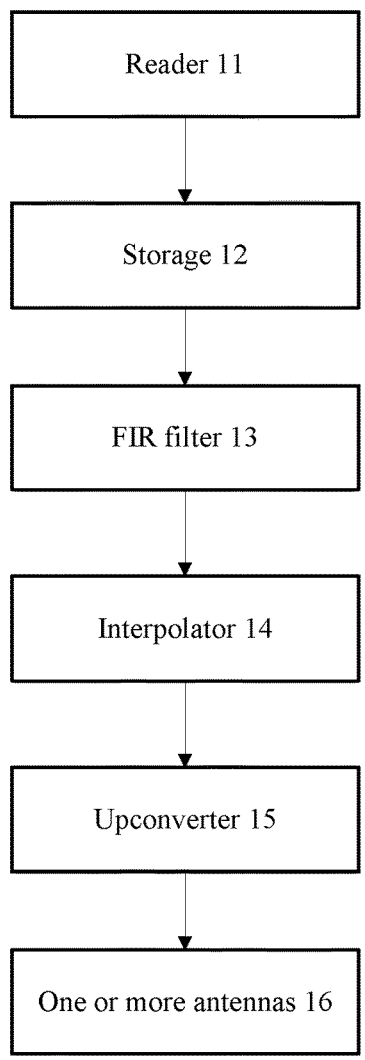
FIG. 1A illustrates an example of a transmitter.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Any reference in the specification to either one of a system, a method and a non-transitory computer readable medium should be applied mutatis mutandis to any other of the system, a method and a non-transitory computer readable medium. For example—any reference to a system should be applied mutatis mutandis to a method that can be executed by the system and to a non-transitory computer readable medium that may stores instructions executable by the system.

Because the illustrated at least one embodiment of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any number, or value illustrated below should be regarded as a non-limiting example. For example—a sampling rate may differ from 10 KHz, a duration of a skywave symbol may differ from 6 milliseconds, and the like.

The following systems, receivers, transmitters, method and non-transitory computer readable medium may refer to the reception, transmission and/or any other process related to skywave symbols.

The skywave symbols may convey any information or data. For example—the skywave symbols may convey information related to the stock market.

The skywave symbols may be orthogonal frequency division multiplexing (OFDM) skywave symbols or may differ from OFDM symbols.

The skywave symbols may be synchronous or asynchronous skywave symbols.

For simplicity of explanation it is assumed that the skywave symbols are OFDM asynchronous skywave symbols.

It should be noted that when low latency is required then the transmission of asynchronous OFDM skywave symbols may be more beneficial than the transmission of synchronous skywave symbols.

FIG. 1A illustrates an example of a transmitter 10.

Transmitter 10 may include a reader 11, a storage 12, a filter such as a FIR unit 13, an interpolator 14, an upconverter 15 and one or more antennas 16. The transmitter may include a controller (not shown) or may be controlled by a controller. The controller may, for example, participate in the execution of method 600 of FIG. 6—for example make any determination related to method 600. The controller may control any operation may by the transmitter.

The reader 11 may receive a message identifier that identifies a message and send to the storage 12 an address in which one or more signals representative of the message.

The storage outputs 12 the signals representative of the message (for example 16-bit I and Q signals at 100 Ksps) to the FIR unit 13 that generates filtered signals (for example 8-bit I and Q filtered signals at 100 Ksps) that are sent to interpolator 14 that increases the sample rate of the filtered signals (for example from 100 Ksps to 125 Msps). The interpolator outputs interpolated signals to upconverter 15 that upconverts the frequency of the signals (for example from baseband signals to HF signals). The HF signals are transmitted over the ionosphere by the one or more antennas 16.

Figure 1B:
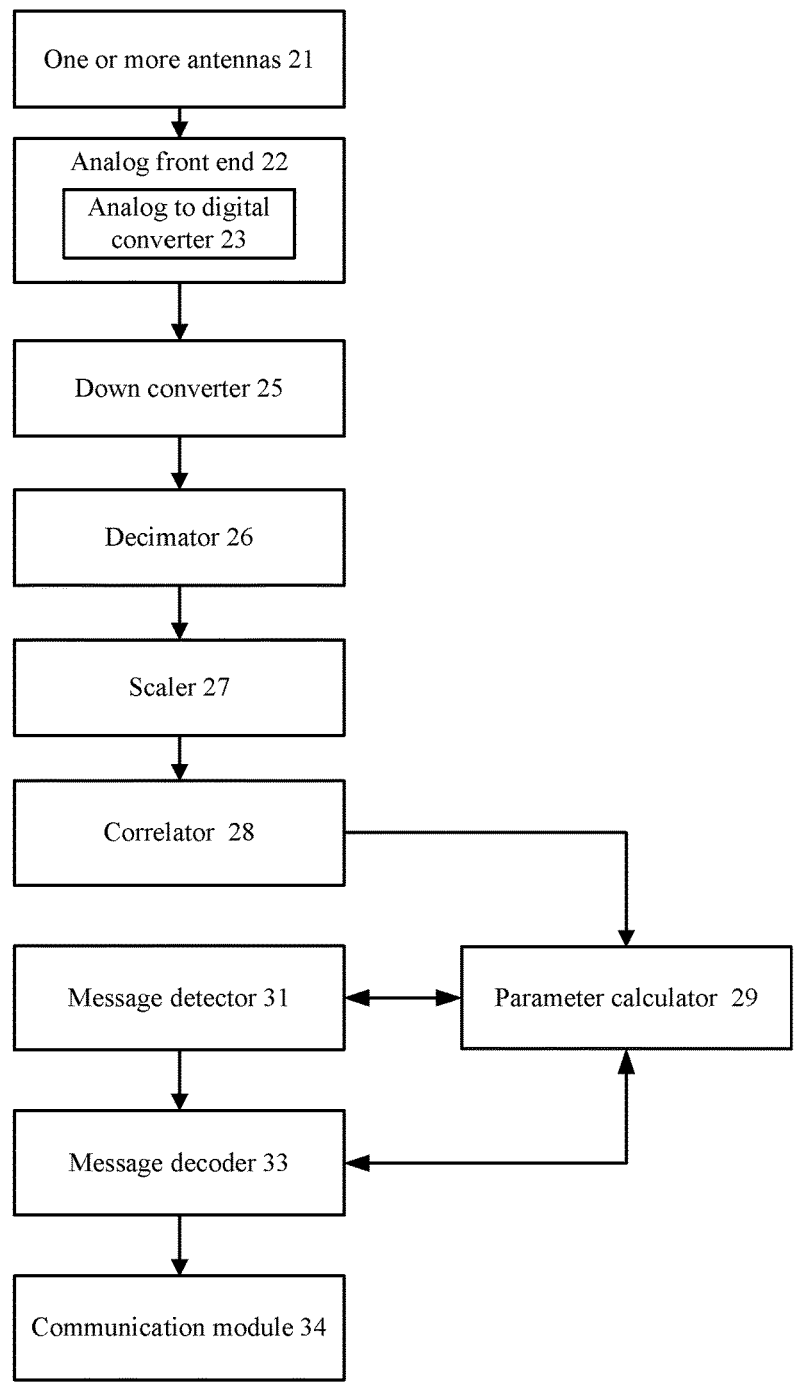
FIG. 1B illustrates an example of a receiver

FIG. 1B illustrates an example of a receiver 20.

Receiver 20 includes one or more antennas 21, analog front end 22 that may include an analog to digital converter 23, downconverter 25, decimator 26, scaler 27, correlator 28, parameter calculator 29, message detector 31, message decoder 33, and communication module 34.

The receiver may include a controller (not shown) or may be controlled by a controller. The controller may, for example, participate in the execution of any method mentioned below. The controller may control any operation may by the receiver.

HF signals are received by the one or more antennas 21 are fed to analog front end 22 and are converted to digital received signals by analog to digital converter 23, converted from RF signals to baseband signals by downconverter 25, have their sampling rate decreased (for example from 125 Mpsp to 10 ksps) by decimator 26, in case of fixed point format being scale to a fixed point format (for example of 16 bits) by scaler 27, undergo frequency to time conversion (such as inverse Fast Fourier transform—IFFT) by correlator 28, having some of their parameters (such as energy parameters) by parameter calculator 29, being detected (symbol detection) by message detector 31, being reconstructed and/or otherwise have their embedded message detected by message decoder 33, and sent to another module of the receiver or to another unit by communication module 34.

The frequency to time conversion may be applied on signals received within a time window (window). The duration of the window may be substantially equal to the duration of a symbol.

Figure 1C:
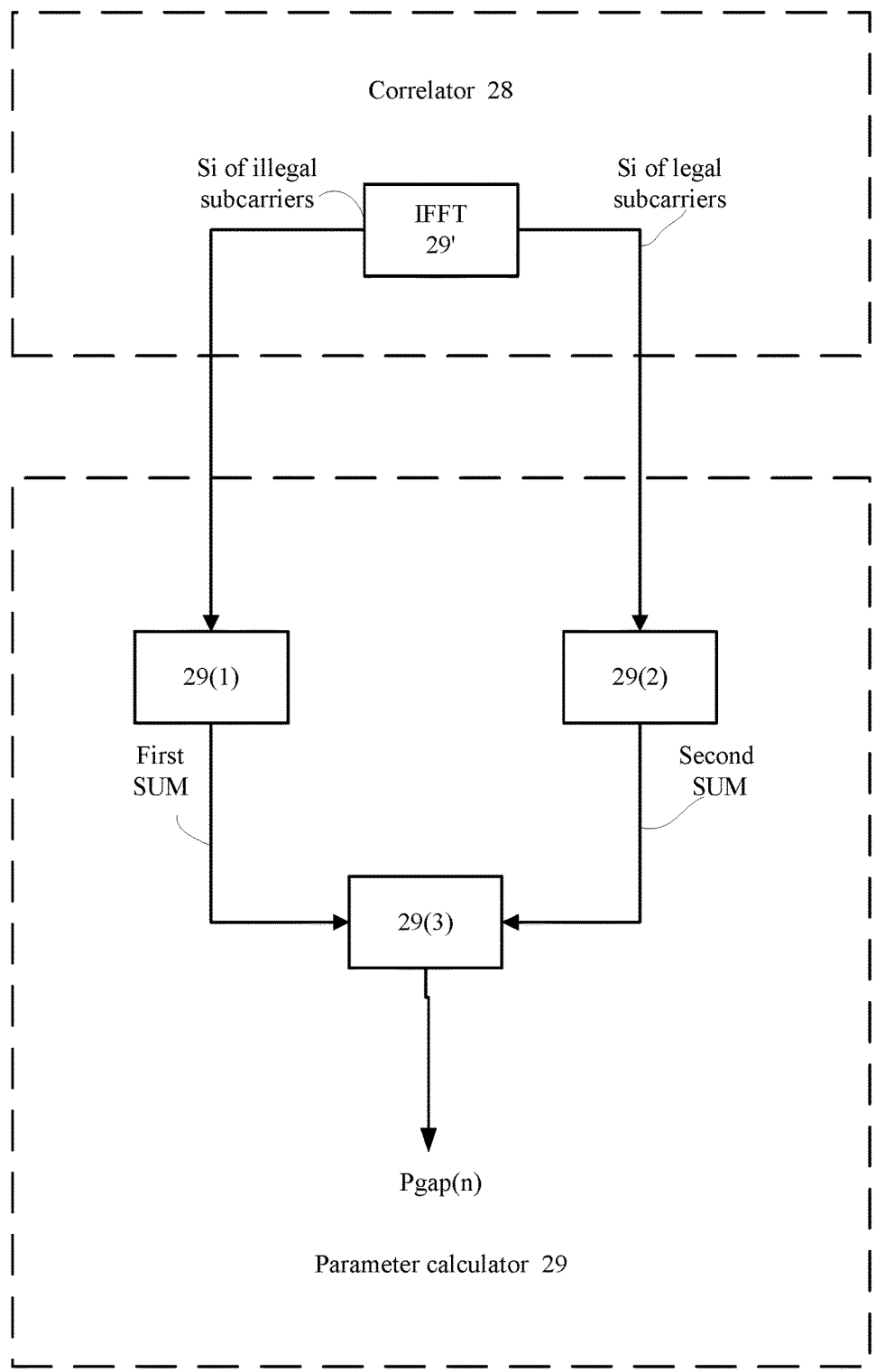
FIG. 1C illustrates an example of an IFFT module and sub-units of parameters calculator.

FIG. 1C illustrates an example of an IFFT module 28' of correlator 28 that outputs transformed outputs Si, as well as illegal subcarriers calculator 29(1), legal subcarriers calculator 29(2), and divider 29(3)—of parameters calculator 29.

The parameters calculator 29 may include other and/or additional of fewer components for calculating one or more energy parameters of received signals.

Illegal subcarrier calculator 29(1) calculates a first sum of squares of Si related to signals received at illegal subcarriers during the window.

Legal subcarrier calculator 29(2) calculates a second sum of squares of Si related to signals received at legal subcarriers during the window.

Divider 29(3) divides the first sum by the other sum to provide parameter $P_{gap}(n)$ that may be used for detecting the message.

FIG. 2A illustrates method 100 for detecting a skywave symbol.

Method 100 may include steps 110, 120 and 130.

Method 100 may start by step 110 of receiving, by a skywave propagation receiver, received signals that are within a skywave frequency range that comprises legal subcarriers and illegal subcarriers.

The skywave symbol may be an orthogonal frequency division multiplexing (OFDM) skywave symbol. The skywave symbol may be transmitted over an asynchronous skywave communication channel.

Step 110 may be followed by step 120 of detecting a reception of the skywave symbol based on at least one energy parameter related to at least two out of (a) received signals at the illegal subcarriers, (b) received signals at the legal subcarriers, (c) received signals at any of the subcarriers.

For example—step 120 may be responsive:
a. Relationships between at least one energy parameter related to (a) received signals at the illegal subcarriers and to (b) received signals at the illegal subcarriers.
b. Relationships between at least one energy parameter related to (a) received signals at the illegal subcarriers and to (c) received signals at any of the subcarriers.
c. Relationships between at least one energy parameter related to (b) received signals at the illegal subcarriers and to (c) received signals at any of the subcarriers.

An energy parameter may be related to the energy and/or power and/or intensity of the received signals.

The duration of step 120 may be less than a length (T) of the skywave symbol. For example—step 120 may be less than 1-90 percent of T— especially less than 60, 40, 30, 20, 10, 7 percent of T.

The duration of step 120 may be less than 6, 4, 3, 2, 1, 0.46, 0.36 milliseconds.

The duration of step 120 may be less than duration of a synchronization preamble based detection of the skywave symbol.

The at least one energy parameter may be calculated over a window. An example of such a window is the Moving Least Square (MVLS) window.

The window may have a duration that substantially equals a duration of the skywave symbol. Substantially equals may allow (for example) a deviation of up to between 1-10 percent from the duration of the skywave symbol.

The width of the window may be selected so that the window rejects sidelobes once applied on the entire symbol. The rejection means that once the window is placed exactly on the entire skywave symbol the relationship between the at least one energy parameters of the legal and illegal subcarriers related to the window is distinguishable.

Step 120 may include detecting an end of a reception of the skywave symbol.

The at least one energy parameter may exhibit a distinctive change at an end of the reception of the skywave symbol.

The distinctive change may be identified accurately even at the presence of noise.

The distinctive change may be a step.

The distinctive change may be a peak—especially a narrow peak. The narrow peak is narrow in the sense that it may about a sampling cycle.

The at least one energy parameter may be indicative of a relationship between (a) an aggregate energy, during a window, of the received signals at the illegal subcarriers; and (b) an aggregate energy, during the window, of the received signals at the legal subcarriers.

At the receiver, the received signals may undergo a frequency to time domain conversion such as inverse Fast Fourier transform (IFFT) to provide transformed outputs.

The at least one energy parameter may related to $P_{gap}(n)$. Index n refers to a n'th window.

$P_{gap}(n)$ may be equal to a ratio between (a) a sum, over the window, of squares of intensities of transformed outputs at any legal subcarrier, and (b) a sum, over the window, of squares of transformed outputs of the intensities of signals received at any illegal subcarrier.

The transformed outputs are denoted Si(n). Si_legal(n) are the transformed outputs related to received signals that were received during the n'th window at legal subcarriers. Si_illegal(n) are the transformed outputs related to received that were received during the n'th window at illegal subcarriers.

$P_{gap}(n)$ may equal $Sum(Si\_legal)/Sum(Si\_illegal)^2$.

The energy parameter may be a derivative of $P_{gap}(n)$ or any other function related to $P_{gap}(n)$.

Figure 2B:
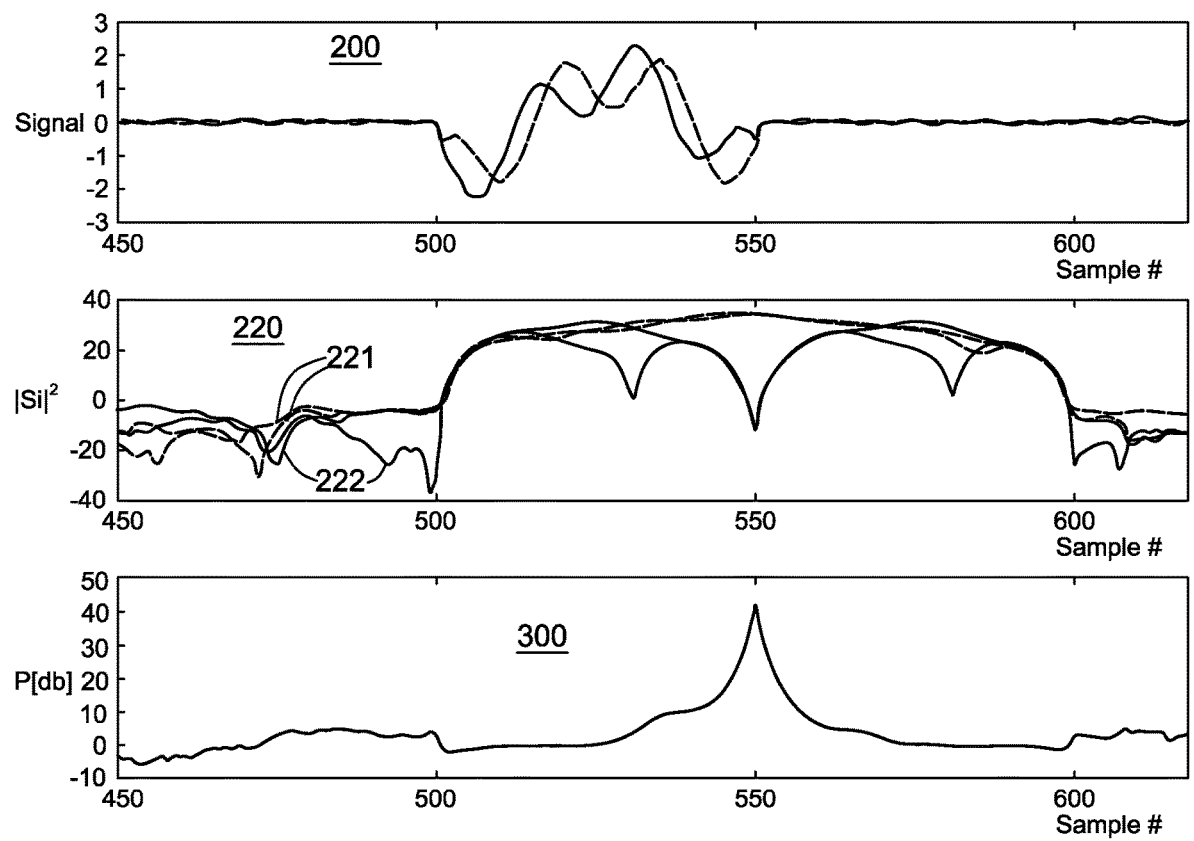
FIG. 2B includes a graph that illustrates the intensity versus time of received signals, a graph that illustrates the different legal and illegal subcarriers over time, and a graph that illustrates values of $P_{gap}(n)$.

FIG. 2B includes a graph 200 that illustrates the intensity (y-axis) versus time (in units of tenths of milliseconds) of received signals. Graph 200 illustrates a complex symbol that is represented by real and imaginary components (one curve per each component).

FIG. 2B also includes a graph 220 that illustrates the different legal subcarrier 221 (dashed lines) and illegal subcarriers 222 (continuous lines) over time. The illegal subcarriers may be regarded (at some points of time) as sidelobes.

FIG. 2B further includes a graph 300 that illustrates the values of $P_{gap}(n)$ given the scenario illustrated in graph 300.

Graph 300 illustrates that the peaks of $P_{gap}(n)$ are narrow, and allow accurate timing acquisition without any preamble signals. Thus, a low-latency algorithm for peak detection is provided.

Graph 300 can be explained by the following:
a. Assuming a window that is about 5 millisecond wide (50 tenths of millisecond) and assuming that the at least one energy parameter is $P_{gap}(n)$.
b. Between points of time 450 and 500 signals in both legal and illegal subcarriers are relatively small (of low intensity).
c. Between point of time 500 and slightly after point of time 500 signals in both legal and illegal subcarriers substantially increase. The signals of the illegal subcarriers at this time frame may be regarded as side bands.
d. Between points of time 540 and 550 the signals in the legal subcarriers maintain high while the signals in the illegal subcarriers substantially decrease.
e. Between points of time 550 and 560 the signals in the legal subcarriers maintain high while the signals in the illegal subcarriers substantially increase.

f. Slightly before point of time 600 signals at both legal and illegal subcarriers substantially decrease. The signals of the illegal subcarriers at this time frame may be regarded as side bands.

g. After point of time 600 in both legal and illegal subcarriers are relatively small (of low intensity)—until the next symbol.

Regarding events a-g—it can be seen that between points of time 450 to after 600 the overall energy (within the window) of the signals in the illegal subcarriers are much higher than the overall energy of the signals in the illegal subcarriers (within the window)—when the window is positioned between points of time 500 and 550—while the signals in the legal subcarriers maintain high throughout the window—the signals in the illegal subcarriers dramatically decrease between points of time 450 and 550—contributing to the peak of $P_{gap}(n)$ at point of time 550.

It should be noted that any peak detector may be used.

A peak detector may be an estimate of the first derivative of $P_{gap}(n)$.

For example—a L-taps least squares estimator may be used to estimate the first derivative of $P_{gap}(n)$:

$$\hat{P}'_{gap}(n) = C + SUM(\text{for } i \text{ between } -L \text{ to zero}) \text{ of } (i+L/2)*P_{gap}(n+i)$$

L may exceed one. Higher L values will increase the noise immune estimate of the first derivative but may increase the latency. L may range, for example between 6 and 9.

The value of L may be fixed or may be changed over time.

For example a L may be selected to provide a latency of about 360 milliseconds when the duration of the skywave symbol is about 6 milliseconds.

Figure 3:
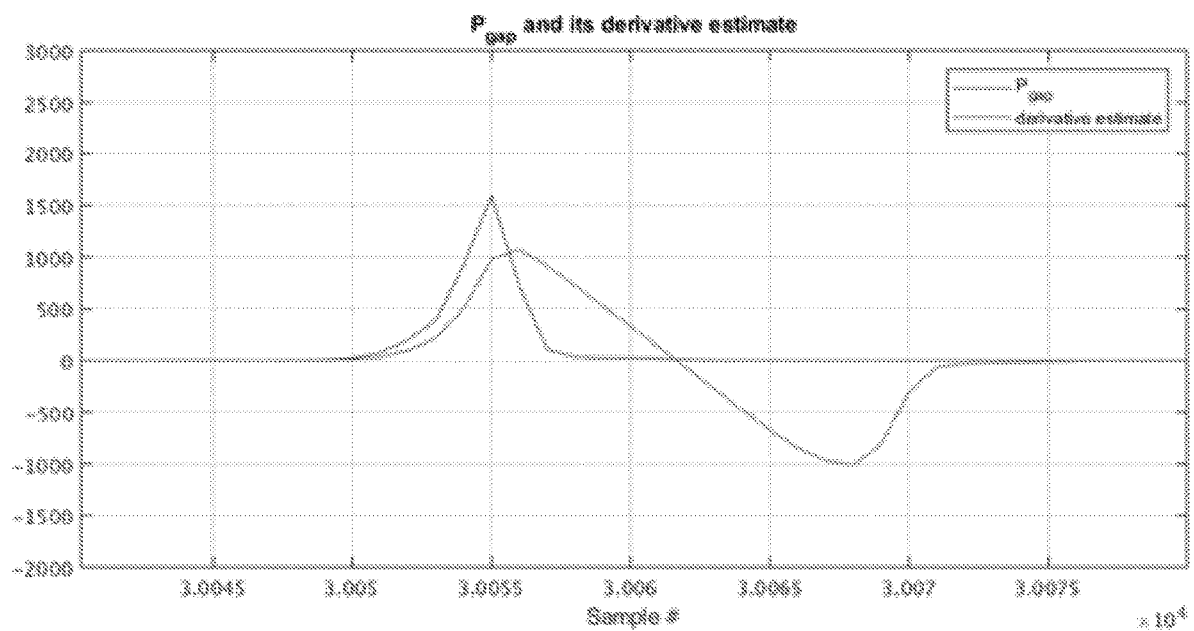
FIG. 3 includes a graph that illustrates the estimate the first derivative of $P_{gap}(n)$.

FIG. 3 includes a graph 350 that illustrates the estimate the first derivative of $P_{gap}(n)$.

The peak detector may consider two conditions:

a. The signal $P_{gap}(n-L/2)$ is greater than pre-defined threshold.

b. The estimate of the first derivative of $P_{gap}(n)$ passed zero: $\hat{P}'_{gap}(n-1)$ was positive and $\hat{P}'_{gap}(n)$ is negative or zero).

If these two conditions are satisfied, the skywave symbol was detected at time $P_{gap}(n-L/2)$.

Thus samples of the skywave symbol may be taken at time differences that correspond to the sampling cycle from $P_{gap}(n-L/2)$.

Accordingly—the latency of method 100 is L/2.

Referring back to FIG. 1.

Step 120 may be followed by step 130 of processing the skywave symbol to extract the message embedded in the skywave symbol.

Step 130 may include sampling the skywave symbol in a manner that is synchronized with the transmitted samples embedded in the skywave symbol.

Step 130 may include reconstructing message, for example by reversing the operations executed by a transmitter after receiving the message.

The skywave symbol may lack a synchronization preamble. The absence of synchronization preamble may shorten the skywave symbol and may speed up the transmission and the reception—especially when the skywave symbol may be detected using a low latency skywave symbol detection method—such as method 100.

As indicated above—the HF channel that exhibits substantial attenuations and/or delays and/or interference that change dynamically over time and frequency. The attenuation of the skywave symbols may dramatically attenuate and even eliminate some subcarriers that were transmitted by a transmitter—and cause receiver to receive a partial skywave symbol (instead of receiving a full skywave symbol).

Figure 4:
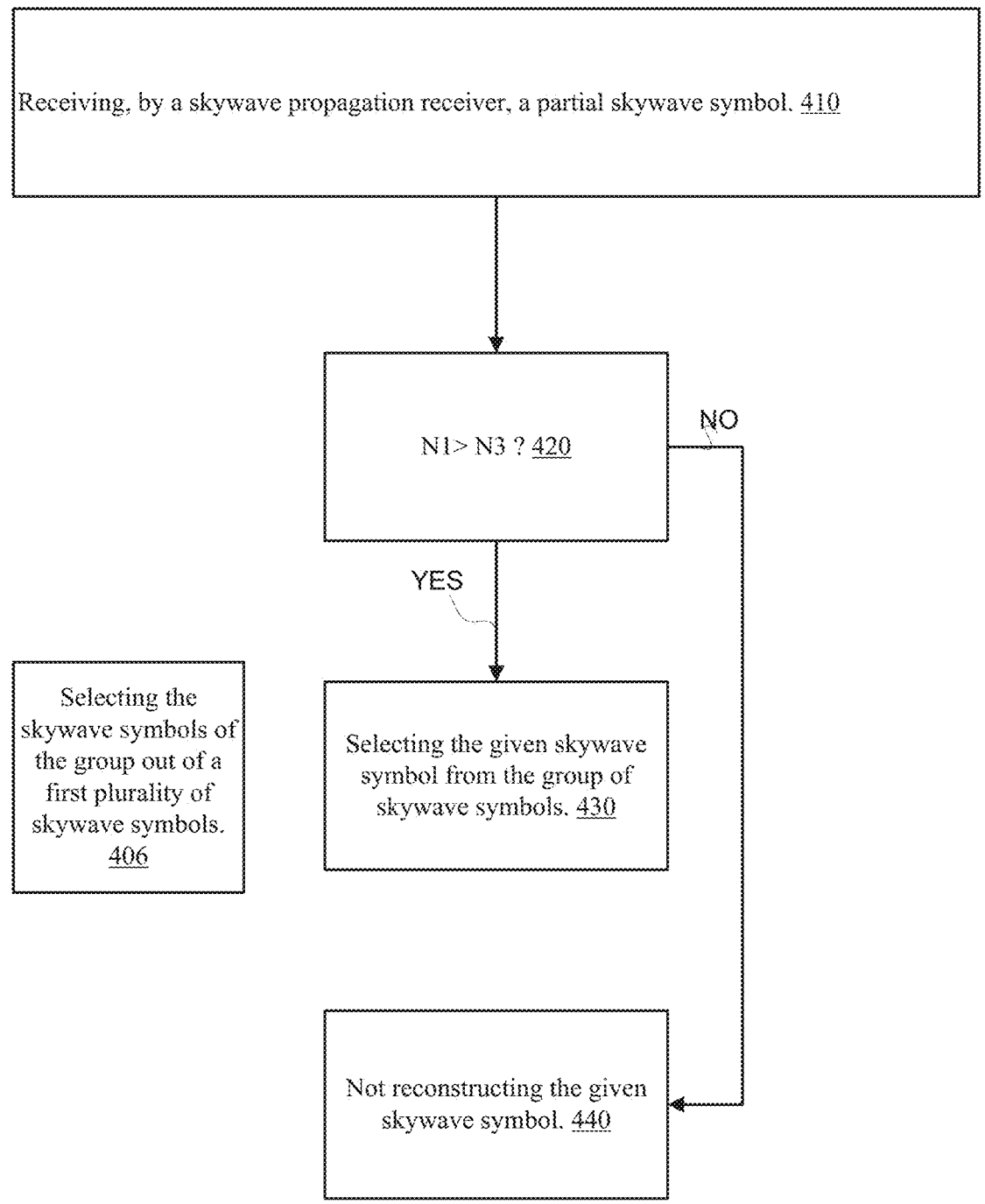
FIG. 4 illustrates a method for symbol reconstruction.

FIG. 4 illustrates method 400 for symbol reconstruction.

Method 400 may start by step 410 of receiving, by a skywave propagation receiver, a partial skywave symbol.

The partial skywave symbol is partial in the sense that only some of the legal subcarriers of a given skywave symbol that was transmitted by a HF transmitter were received by a HF receiver.

The given skywave symbol includes a set of a second number (N2) of legal subcarriers.

The partial skywave symbol has only a first number (N1) of legal subcarriers out of the set of N2 of legal subcarriers.

The given skywave symbol belongs to a group of skywave symbols. Each pair of skywave symbols of the group share up to a third number (N3) of legal subcarriers.

Step 410 may include detecting which legal subcarriers convey a valid signal (for example a "1" signal).

The detection may include thresholding signals received over legal subcarriers to determine a reception of a valid signal over each one of the legal threshold.

The thresholding may or may not be responsive to a number of legal subcarriers deemed to include valid signals.

For example—when receiving a partial skywave symbol the threshold (per legal subcarrier) may be higher than the threshold applied when receiving the entire skywave symbol.

Step 410 may be followed by step 420 of determining whether N1 exceeds N3.

If N1 exceeds N3 then there are enough unique legal subcarriers to reconstruct the given legal subcarrier—and step 420 is followed by step 430 of selecting the given skywave symbol from the group of skywave symbols.

If N1 does not exceed N3 then there are not enough unique legal subcarriers to reconstruct the given legal subcarrier—and step 420 is followed by step 440 of not reconstructing the given skywave symbol.

The skywave symbols of the group may exhibit frequency diversion.

Frequency diversion of a skywave symbol may be obtained when legal and illegal subcarriers of the skywave symbol are spread enough across a skywave frequency range so that narrowband interferences will (a) affect both legal and illegal subcarriers and/or (b) will not mask at least a predefined number of illegal and legal subcarriers.

For example the illegal subcarriers and the legal subcarriers may be interleaved.

The illegal subcarriers may be spread across at least a majority of a skywave frequency range and the legal subcarriers may be spread across at least the majority of the skywave frequency range.

The skywave symbols of the group may be orthogonal frequency division multiplexing (OFDM) skywave symbols.

The skywave symbols of the group may be asynchronous skywave symbols.

The group of skywave symbols may be selected out of a first plurality of skywave symbols. For example—the first plurality of skywave symbols may include all possible combinations of legal subcarriers out a subcarriers within a skywave frequency range that is received by skywave receiver or within a skywave frequency range that corresponds to the entire HF range or to a subrange of the entire HF range.

Method 400 may include step 406 of selecting the skywave symbols of the group out of a first plurality of skywave symbols.

Step 406 may be executed once, or multiple times. Usually, step 406 may be executed once per a vast number of iterations of other steps of method 400.

Step 406 may be executed by applying an iterative process.

Step 406 may include finding one candidate skywave symbol after the other based on overlaps between candidate skywave symbols to previously selected candidate skywave symbols, and selecting the skywave symbols that form the group based on a frequency diversion score associated to the candidate skywave symbols.

The following pseudo-code is for executing step 406.

The pseudo-code is an example of a greedy (sub-optimal) algorithm such as a Monte-Carlo based optimization in a sense of maximum frequency diversity for each symbol.

In the pseudo code N3 is denoted $N_{bins}$ and the actual overlap is denoted L.

Symbols Create list of all combinations of $N_{bins}$ out of |LEGAL|
$Symbols_{opt}$ null
$Score_{opt}$ inf
For k=1:num_of_trails:
$Symbol_p$ Random permutation of Synbols
i 1
  While i<length($Symbols_p$)
  $Symbols_p$ Remove from $Symbols_p$ items that overlap to
    $Symbols_p$[i] in more than L bins.
  idx Find in i+1, . . . , length ($Symbols_p$) the item with the
    minimum overlap to $Symbols_p$[i+1: end].
  // Find the optimal symbol for the next step // (we want remove minimum symbols in the next step).
  Swap($Symbols_p$[idx]<->$Symbols_p$[i+1]) // Make the optimal one—the next one
  i i+1
If length ($Symbols_p$)>num_of_msgs: // If it has sufficient number of symbols, optimize // frequency diversity
  Score 0
  For each symbol in $Symbols_p$:
  score score+(minimal frequency difference between subcarriers in symbol)
    If score >$Score_{opt}$:
      $Score_{opt}$ score
      $Symbols_{opt}$ $Symbols_p$ In some applications, there are messages that are more important than others. In some a transmission of a lower priority message may be terminated when a higher priority message is received. The termination of the transmission of the lower priority message may reduce the latency associated with the transmission of the higher priority message—as there is no need to wait to the completion of the transmission of the lower priority symbol.

Figure 5:
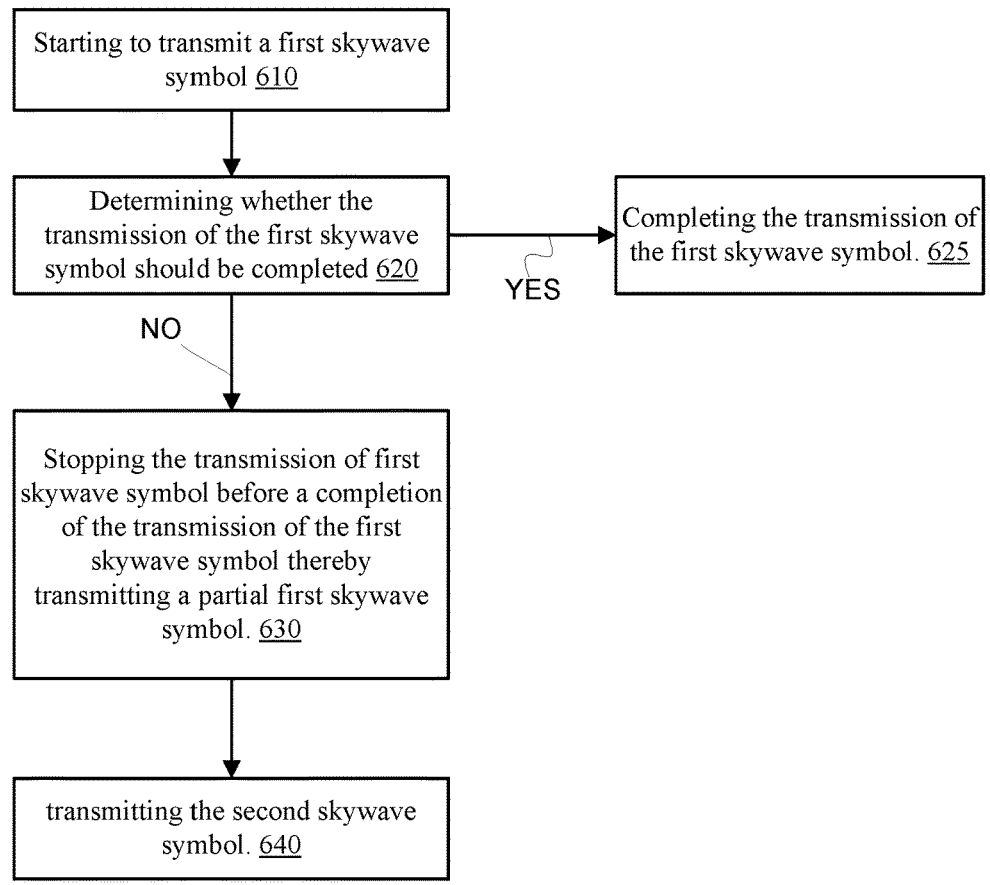
FIG. 5 illustrates a method of priory based transmission of skywave symbols.

FIG. 5 illustrates method 600 of priory based transmission of skywave symbols.

Method 600 may start by step 610 of starting to transmit a first skywave symbol.

Step 610 may be followed by step 620 determining checking whether the transmission of the first skywave symbol should be completed—and if so step 620 may be followed by step 625 of completing the transmission of the first skywave symbol.

Step 620 may include determining to stop the transmission of the first skywave symbol when there is a need to transmit (without waiting to a completion of the transmission of the first) of a second skywave symbol that has a higher priority than the first skywave symbol. Step 620 may be triggered by a reception of a request to transmit the second skywave symbol.

Step 620 may include at least one of the following:

a. Determining based on (a) a priority difference between the first and second skywave symbols, (b) a time gap between the starting of the transmission of the first skywave symbol and the determining, and (c) a length of the first skywave symbol.

b. Determining based on (a) a priority difference between the first and second skywave symbols, and (b) a time gap between the starting of the transmission of the first skywave symbol and the stopping of the transmission of the partial first skywave symbol, and (c) a length of the first skywave symbol.

c. Determining to stop the transmission of the first skywave symbol and to transmit the second skywave symbol when (a) a product of a multiplication of a constant by a length of the first skywave symbol exceeds (b) a time gap between the starting of the transmission of the first skywave symbol and the determining.

d. Determining to stop the transmission of the first skywave symbol and to transmit the second skywave symbol when (a) a product of a multiplication of a constant by a length of the first skywave symbol exceeds (b) a time gap between the starting of the transmission of the first skywave symbol and the stopping of the transmission of the partial first skywave symbol.

Step 620 may be followed by step 630 of stopping the transmission of first skywave symbol before a completion of the transmission of the first skywave symbol thereby transmitting a partial first skywave symbol.

Step 630 may be followed by step 640 of transmitting the second skywave symbol.

Step 640 may include introducing a gap between the stopping of the transmission of the first skywave symbol and a start of the transmitting of the second skywave symbol.

Step 640 may include transmitting the second skywave symbol without introducing a gap between the stopping of the transmission of the first skywave symbol and a start of the transmitting of the second skywave symbol.

The second skywave symbol and the partial first skywave symbol may include illegal subcarrier signals and legal subcarrier signals.

The transmission of the partial first skywave symbol (steps 610, 625) is distinguishable (by a receiver) from the transmittal (step 640) of the second skywave symbol based on at least one energy parameters related to the legal and illegal subcarrier signals of the second skywave symbol and the partial first skywave symbol.

For example—the skywave receiver can regard the partial first skywave symbol as noise or an invalid symbol—even without receiving an explicit notification.

When applying method 100, the partial first skywave symbol may not be detected as a symbol.

The first and second skywave symbols may be asynchronous skywave symbols.

The first and second skywave symbols may be orthogonal frequency division multiplexing (OFDM) skywave symbols.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation; a single operation may be distributed in additional operations and operations may be executed at least partially overlapping in time. Moreover, alternative embodiments may include multiple instances of an operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The terms "including", "comprising", "having", "consisting" and "consisting essentially of" are used in an interchangeable manner. For example—any method may include at least the steps included in the figures and/or in the specification, only the steps included in the figures and/or the specification.

What is claimed is:

1. A method for priory based transmission of skywave symbols, the method comprises:
   starting to transmit a first skywave symbol;
   determining to stop a transmission of the first skywave symbol and to transmit a second skywave symbol that has a higher priority than the first skywave symbol;
   stopping the transmission of first skywave symbol before a completion of the transmission of the first skywave symbol thereby transmitting a partial first skywave symbol; and
   transmitting the second skywave symbol.

2. The method according to claim 1 comprising introducing a gap between the stopping of the transmission of the first skywave symbol and a start of the transmitting of the second skywave symbol.

3. The method according to claim 1 comprising transmitting the second skywave symbol without introducing a gap between the stopping of the transmission of the first skywave symbol and a start of the transmitting of the second skywave symbol.

4. The method according to claim 1 wherein each one of the second skywave symbol and the partial first skywave symbol comprises illegal subcarrier signals and legal subcarrier signals; wherein the transmission of the partial first skywave symbol is distinguishable from the transmittal of the second skywave symbol based on at least one energy parameters related to the legal and illegal subcarrier signals of the second skywave symbol and the partial first skywave symbol.

5. The method according to claim 1 wherein the determining is based on (a) a priority difference between the first and second skywave symbols, (b) a time gap between the starting of the transmission of the first skywave symbol and the determining, and (c) a length of the first skywave symbol.

6. The method according to claim 1 wherein the determining is based on (a) a priority difference between the first and second skywave symbols, and (b) a time gap between the starting of the transmission of the first skywave symbol and the stopping of the transmission of the partial first skywave symbol, and (c) a length of the first skywave symbol.

7. The method according to claim 1 comprising determining to stop the transmission of the first skywave symbol and to transmit the second skywave symbol when (a) a product of a multiplication of a constant by a length of the first skywave symbol exceeds (b) a time gap between the starting of the transmission of the first skywave symbol and the determining.

8. The method according to claim 1 comprising determining to stop the transmission of the first skywave symbol and to transmit the second skywave symbol when (a) a product of a multiplication of a constant by a length of the first skywave symbol exceeds (b) a time gap between the starting of the transmission of the first skywave symbol and the stopping of the transmission of the partial first skywave symbol.

9. The method according to claim 1 wherein the first and second skywave symbols are asynchronous skywave symbols.

10. The method according to claim 1 wherein the first and second skywave symbols are orthogonal frequency division multiplexing (OFDM) skywave symbols.

11. A non-transitory computer readable medium that stores instructions for:
   starting to transmit a first skywave symbol;
   determining to stop a transmission of the first skywave symbol and to transmit a second skywave symbol that has a higher priority than the first skywave symbol;

stopping the transmission of first skywave symbol before a completion of the transmission of the first skywave symbol thereby transmitting a partial first skywave symbol; and transmitting the second skywave symbol.

12. The non-transitory computer readable medium according to claim 11 that stores instructions for introducing a gap between the stopping of the transmission of the first skywave symbol and a start of the transmitting of the second skywave symbol.

13. The non-transitory computer readable medium according to claim 11 that stores instructions for transmitting the second skywave symbol without introducing a gap between the stopping of the transmission of the first skywave symbol and a start of the transmitting of the second skywave symbol.

14. The non-transitory computer readable medium according to claim 11 wherein each one of the second skywave symbol and the partial first skywave symbol comprises illegal subcarrier signals and legal subcarrier signals; wherein the transmission of the partial first skywave symbol is distinguishable from the transmittal of the second skywave symbol based on at least one energy parameters related to the legal and illegal subcarrier signals of the second skywave symbol and the partial first skywave symbol.

15. The non-transitory computer readable medium according to claim 11 wherein the determining is based on (a) a priority difference between the first and second skywave symbols, (b) a time gap between the starting of the transmission of the first skywave symbol and the determining, and (c) a length of the first skywave symbol.

16. The non-transitory computer readable medium according to claim 11 wherein the determining is based on (a) a priority difference between the first and second skywave symbols, and (b) a time gap between the starting of the transmission of the first skywave symbol and the stopping of the transmission of the partial first skywave symbol, and (c) a length of the first skywave symbol.

17. The non-transitory computer readable medium according to claim 11 that stores instructions for determining to stop the transmission of the first skywave symbol and to transmit the second skywave symbol when (a) a product of a multiplication of a constant by a length of the first skywave symbol exceeds (b) a time gap between the starting of the transmission of the first skywave symbol and the determining.

18. The non-transitory computer readable medium according to claim 11 that stores instructions for determining to stop the transmission of the first skywave symbol and to transmit the second skywave symbol when (a) a product of a multiplication of a constant by a length of the first skywave symbol exceeds (b) a time gap between the starting of the transmission of the first skywave symbol and the stopping of the transmission of the partial first skywave symbol.

19. The non-transitory computer readable medium according to claim 11 wherein the first and second skywave symbols are asynchronous skywave symbols.

* * * * *